US011075985B2

(12) United States Patent
Mestery et al.

(10) Patent No.: US 11,075,985 B2
(45) Date of Patent: Jul. 27, 2021

(54) EARLY ACTION ON DEPLOYING AND EXECUTING FUNCTIONS IN A SERVERLESS ENVIRONMENT

(71) Applicant: Cisco Technology, Inc., San Jose, CA (US)

(72) Inventors: Kyle Mestery, Woodbury, MN (US); Ian Wells, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 196 days.

(21) Appl. No.: 16/185,623

(22) Filed: Nov. 9, 2018

(65) Prior Publication Data
US 2020/0153897 A1    May 14, 2020

(51) Int. Cl.
| G06F 9/50 | (2006.01) |
| H04L 12/801 | (2013.01) |
| H04L 29/08 | (2006.01) |
| H04L 12/803 | (2013.01) |
| G06F 9/48 | (2006.01) |

(52) U.S. Cl.
CPC ........ *H04L 67/1014* (2013.01); *G06F 9/4856* (2013.01); *G06F 9/505* (2013.01); *G06F 9/5077* (2013.01); *G06F 9/5083* (2013.01); *H04L 47/125* (2013.01); *H04L 47/19* (2013.01); *H04L 67/2842* (2013.01)

(58) Field of Classification Search
CPC ...... G06F 9/4856; G06F 9/505; G06F 9/5077; G06F 9/5083
See application file for complete search history.

(56) References Cited

U.S. PATENT DOCUMENTS

| 7,778,194 B1 * | 8/2010 | Yung | H04L 47/10 |
| | | | 370/252 |
| 9,600,312 B2 | 3/2017 | Wagner | |
| 9,762,619 B1 * | 9/2017 | Vaidya | G06F 9/455 |
| 9,979,602 B1 | 5/2018 | Chinnakannan et al. | |

(Continued)

FOREIGN PATENT DOCUMENTS

WO    2016066199 A1    5/2016

OTHER PUBLICATIONS

"TCP Fast Open", Radhakrishnan et al., 2011 (Year: 2011).*

(Continued)

*Primary Examiner* — Tonia L Dollinger
*Assistant Examiner* — Jonathan A Sparks
(74) *Attorney, Agent, or Firm* — Edell, Shapiro & Finnan, LLC

(57) ABSTRACT

A system is provided to support a serverless environment and quickly generate containers to handle requests. The system includes a first network node, a container orchestration system, and a serving node. The first network node receives an initial packet of a request from a host and sends a notification to a container orchestration system. The notification includes header information from the initial packet and signals the reception of the initial packet of the request. The container orchestration system creates one or more new containers in response to the notification based on the header information of the initial packet. The serving node instantiates the new containers, receives the request from the host, and processes the request from the host with the new containers.

20 Claims, 5 Drawing Sheets

(56) References Cited

U.S. PATENT DOCUMENTS

| 10,318,347 | B1* | 6/2019 | Wagner | G06F 9/45508 |
|---|---|---|---|---|
| 2015/0172354 | A1* | 6/2015 | Coppola | H04L 65/80 |
|  |  |  |  | 709/203 |
| 2016/0315814 | A1 | 10/2016 | Thirumurthi et al. | |
| 2019/0028559 | A1* | 1/2019 | Sampat | H04L 67/2814 |
| 2019/0306282 | A1* | 10/2019 | Masputra | H04L 47/2475 |
| 2019/0392150 | A1* | 12/2019 | Shevade | G06F 9/5072 |

OTHER PUBLICATIONS

RFC 7413, "TCP Fast Open", Dec. 2014. (Year: 2014).*
International Search Report and Written Opinion in counterpart International Application No. PCT/US2019/059304, dated Jan. 27, 2020, 16 pages.
S. Natarajan, "An Analysis of Lightweight Virtualization Technologies for NFV", NFVRG, Internet Draft, Category: Informational, https://tools.ietf.org/html/draft-natarajan-nfvrg-containers-for-nfv-03, Jul. 8, 2016, 16 pages.
Sai Man Wong, "An Evaluation of Software-Based Traffic Generators using Docker", Master's Thesis in Computer Science at School of Computer Science and Communication, KTH, www.kth.se, Degree Project in Computer Science and Engineering, Second Cycle, 30 Credits, Stockholm, Sweden, 2018, 65 pages.
Junaid Khalid, et al., "Iron: Isolating Network-based CPU in Container Environments", https://www.usenix.org/conference/nsdi18/presentation/khalid, Proceedings of the 15th USENIX Symposium of Networked Systems Design and Implementation (NSDI'18), Apr. 9-11, 2018, Renton, WA, US, ISBN 978-1-931971-43-0, 17 pages.

\* cited by examiner

EARLY ACTION ON DEPLOYING AND EXECUTING FUNCTIONS IN A SERVERLESS ENVIRONMENT

TECHNICAL FIELD

The present disclosure relates to deploying functions in a serverless network environment.

BACKGROUND

In some modern network environments (e.g., using a Function-as-a-Service (FaaS) model), functions that have typically been run on servers may be diverted to containers that can be run on any computing device, including network devices. This enables the networking functions and server functions to be processed at the same physical device, increasing the speed of processing server requests. A network environment directed to running a particular function and returning network traffic may ingest traffic (e.g., a request) at the edge of a cluster, such as at a load balancer. The load balancer sends the traffic into the cluster to the node with the endpoint address, where it arrives (e.g., at a virtual switch). The virtual switch decodes the traffic and sends it into the host node's network stack (e.g., a Transport Control Protocol (TCP) stack). The TCP stack sends the traffic to the application stack of the operating systems, which generate a pod of one or more containers to handle the traffic. After the containers are generated, the virtual switch diverts the traffic to the containers in the pod.

The latency in this process is the sum of crossing the TCP stack at the ingest load balancer, crossing the TCP stack of the host node, waiting for the containers to start running, waiting for the result from the code execution in the containers, and crossing the TCP stack of the host node to return the result. Since the containers are not guaranteed to be running when a related service request is received, all of these elements generate sequential latency in responding to service requests.

DESCRIPTION OF EXAMPLE EMBODIMENTS

Overview

A system is provided to support a serverless environment and quickly generate containers to handle requests. The system comprises a first network node, a container orchestration system, and a serving node. The first network node is configured to receive an initial packet of a request from a host and send a notification to a container orchestration system. The notification includes header information from the initial packet and signals the reception of the initial packet of the request. The container orchestration system is configured to create a new container in response to the notification based on the header information of the initial packet. The serving node is configured to instantiate the new container, receive the request from the host, and process the request from the host with the new container.

DETAILED DESCRIPTION

The techniques presented herein provide for using a network element, such as a switch or load balancer, to intercept network requests at an early stage and work with a container orchestration system to instantiate pods of containers to handle the requests. This enables truly hot standby pods, while allowing the requests to drive when pods of containers are started on network nodes.

In one example of a workflow, an Application Programming Interface (API) request from a requester comes into a switch. The initial SYN packet of a TCP handshake may be used to initiate container orchestration. The traffic may then be forwarded to a load balancer, where the SYN packet may be alternatively tapped to initiate container orchestration. The API request comes out of the TCP stack into the load balancer after the TCP handshake with the sender, which takes some time and is unavoidable for a TCP connection. The load balancer determines a host to handle the API request, which may be a newly started container in the case of prompted container orchestration. The API request shows up at the host in a virtual switch running in user space. The virtual switch detects the API request and works with the container orchestration system to create a pod of containers to handle the API request. The pod may remain running on the host for a set amount of time to handle additional API requests. The virtual switch may shut down the pod after a set amount of time in which no additional API requests appear.

Figure 1:
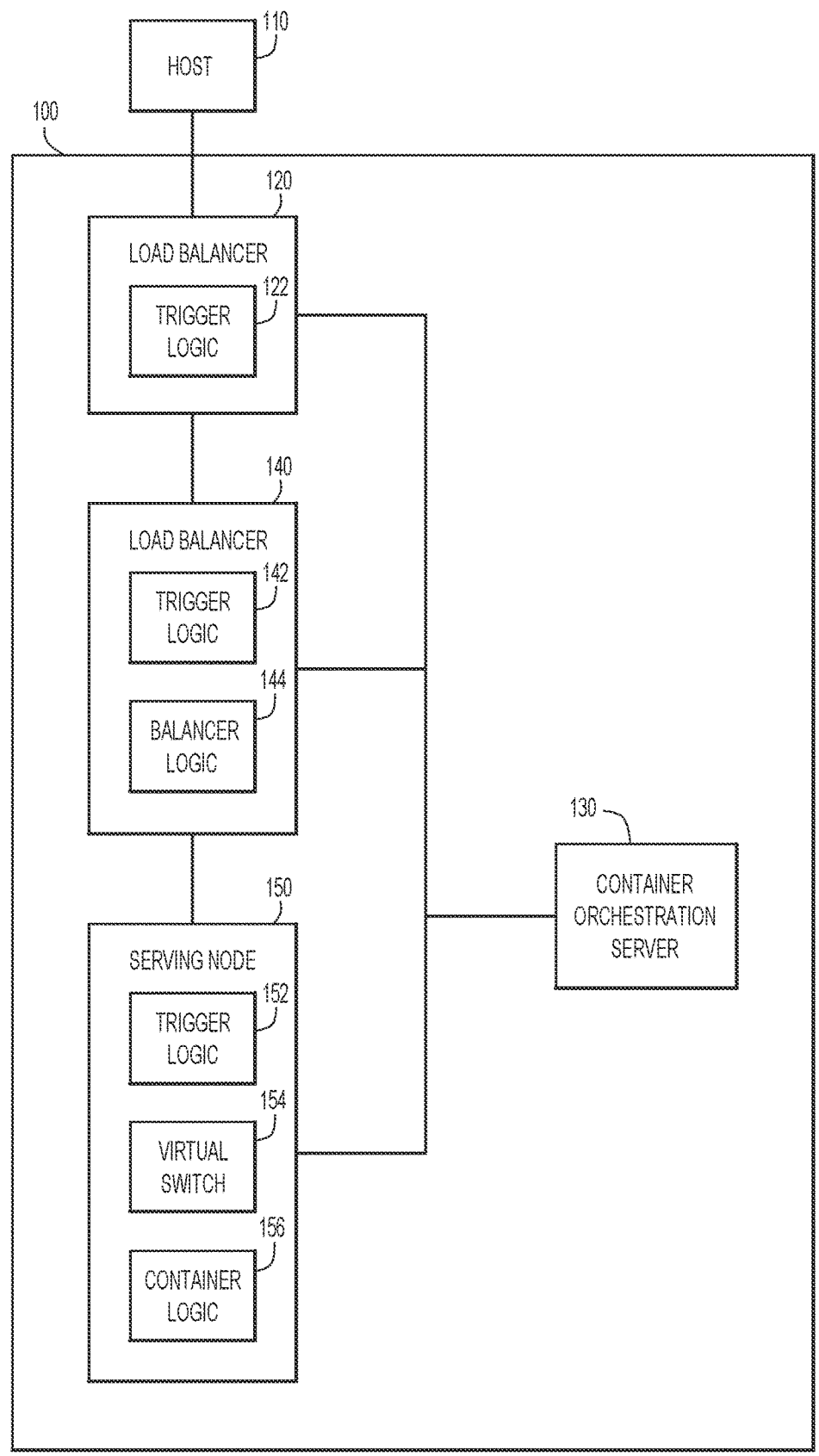
FIG. 1 is a system block diagram illustrating a serverless network environment that provides for early deployment of containers in response to incoming network requests, according to an example embodiment.

Referring now to FIG. 1, a simplified block diagram shows a network environment 100 for handling requests from a host 110. The host 110 sends requests through a network node 120 that includes a trigger logic 122. In one example, the network node 120 may be a gateway router on the edge of the network environment 100. The trigger logic 122 enables the network node 120 to notify a container orchestration system 130 when a request enters the network environment 100. The container orchestration system 130 may include one or more computing devices that coordinate the implementation of containers throughout the network environment 100. As used hereinafter, the container orchestration system 130 may be referred to as container orchestration server 130 or as COS 130.

The network environment 100 also includes a load balancer 140 with trigger logic 142 and load balancing logic 144. The trigger logic 142 is similar to trigger logic 122 in the network node 120, and enables the load balancer 140 to notify the container orchestration system 130 when a request reaches the load balancer 140.

The network environment 100 further includes a serving node 150 with trigger logic 152, a virtual switch 154, and container logic 156. The trigger logic 152 is similar to trigger logic 122 in the network node 120, and enables the serving node 150 to notify the container orchestration system 130 when a request reaches the serving node 150. In one example, only one of the network node 120, load balancer 140, or serving node 150 will be actively designated as the trigger node with active trigger logic 122, 142, or 152, to prevent all of the nodes from notifying the container orchestration system 130 about the same request. The virtual switch 154 enables the computing device of the serving node 150 to implement network switching functions (e.g., for containers generated by container logic 156). In one example, the container logic 156 includes a local agent for the COS 130 that processes instructions from the COS 130 to handle the containers on the serving node 150. For instance, the container logic 156 may spin up containers to handle requests received at the serving node 150 in a serverless system.

Figure 2:
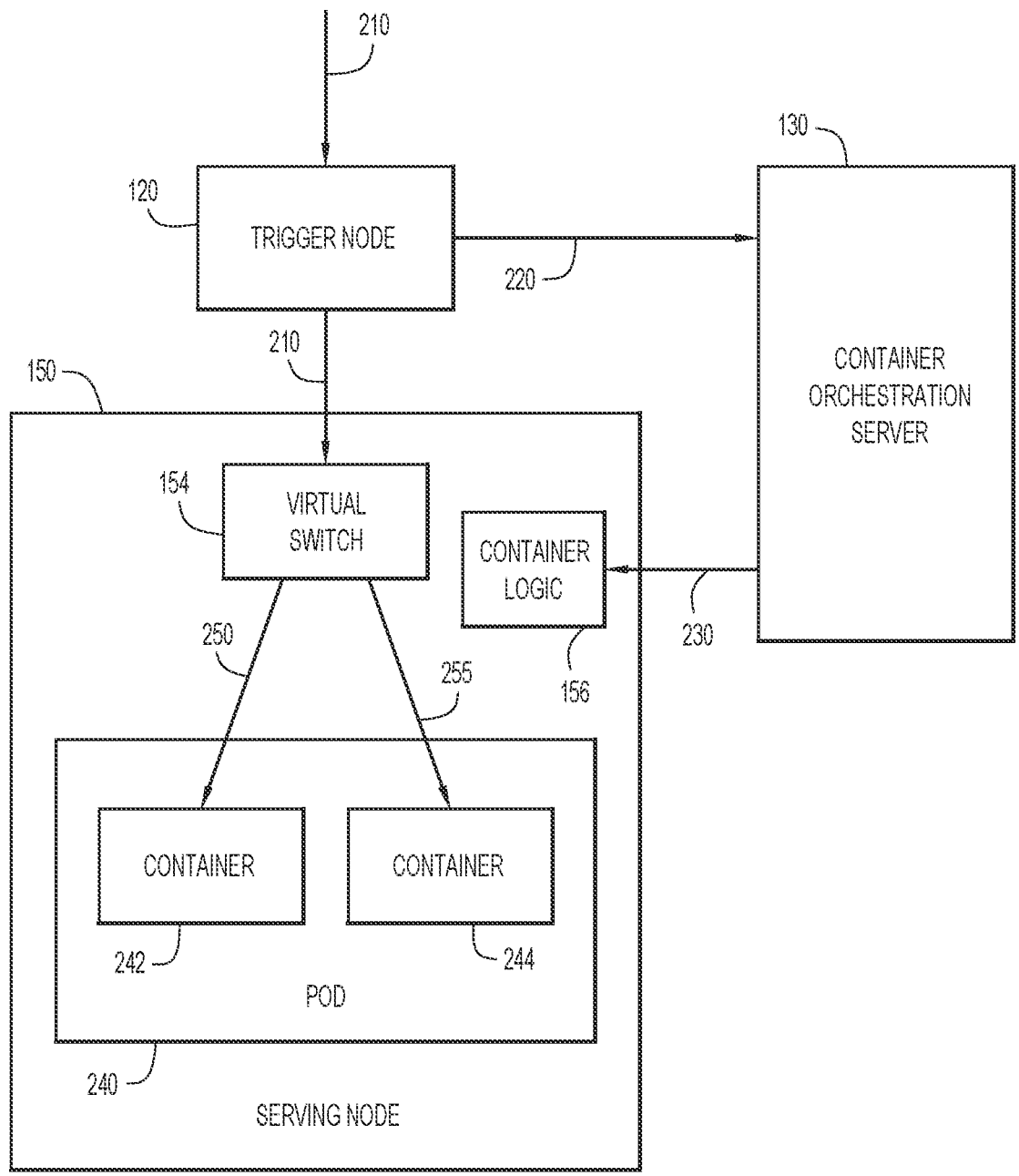
FIG. 2 is a simplified block diagram of messages passed in notifying the container orchestration system to prepare for an incoming request, according to an example embodiment.

Referring now to FIG. 2, a simplified diagram shows messages passed between nodes in the network environment in one example of the techniques described herein. The trigger node 120 receives a request 210 (e.g., an API request) originally from a host. The request 210 includes a destination network address associated with a network address on the virtual switch 154 of the serving node 150. When the trigger node 120 receives the initial packet of the request 210, trigger logic in the trigger node 120 sends a notification 220 to the container orchestration server 130. The notification 220 indicates that the trigger node 120 has received the initial packet of the request 210. The trigger node 120 also forwards the request 210 to the virtual switch 154 indicated in the destination address of the request 210.

The COS 130 sends an instruction message 230 to the container logic 156 in the serving node 150. The instruction message 230 directs the container logic 156 to instantiate a pod 240 with containers 242 and 244 in order to handle the request 210. The serving node 150 starts the containers 242 and 244 in the pod 240 and directs the virtual switch 154 to forward the request 210 to the pod 240. In this example, the request 210 is handled by forward different portions of the request 210 (i.e., portions 250 and 255) to the two different containers (i.e., containers 242 and 244, respectively). In other examples, the request 210 may be directed, either completely or in part, to one or more containers in the pod 240.

In one example, the notification 220 may include information to assist the COS 130 in determining which containers (e.g., containers 242 and 244) to direct the serving node 150 to instantiate. For instance, the notification 220 may include the type of packet (e.g., a TCP/IP packet) and the destination address (e.g., the destination Internet Protocol (IP) address) of the initial packet. From the information in the notification 220, the COS 130 determines one or more appropriate containers with functions to handle the request 210.

In another example, to generate the notification 220, the trigger node 120 does not parse the packets of the request 210 at a higher level than necessary to forward the packets. In other words, the trigger node 120 does not read the payload of the packets where higher layer information is stored. The notification 220 may include information from the network layer (i.e., layer 3 in the Open Systems Interconnect (OSI) model) packet header. In some instances, such as when the payload of the initial layer 3 packet of the request 210 is encrypted, the trigger node 120 does not have access to any information from higher layers, and any information in the notification 220 is derived from layer 3 (or lower) information.

In a further example, after processing the request 210, the container logic 156 may remove the pod 240 with the containers 242 and 244 from the serving node 150. Alternatively, the container logic 156 may keep the pod 240 with the containers 242 and 244 running to handle any additional requests. For instance, the container logic 156 may maintain the pod 240 until a predetermined amount of time has passed without any requests being directed to the containers 242 and/or 244 in the pod 240. Alternatively, the container logic 156 may maintain the pod 240 indefinitely until the resources of the serving node 150 are needed for a different task (e.g., instantiating a different pod to handle a different type of request).

Figure 3:
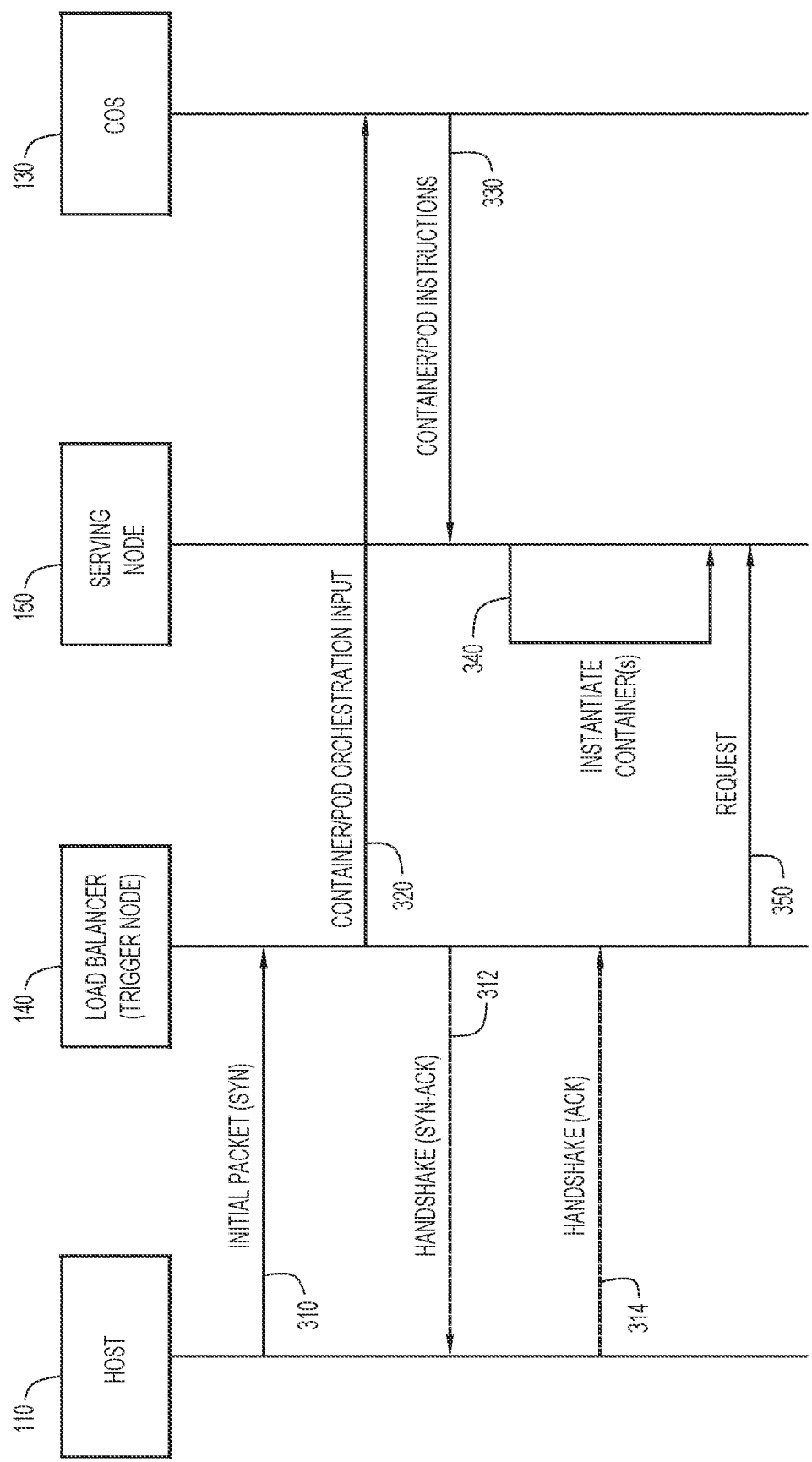
FIG. 3 is a sequence diagram showing messages passed to instantiate containers while completing a protocol handshake, according to an example embodiment.

Referring now to FIG. 3, a message flow diagram shows messages passed between nodes in another example of the techniques described herein. The host 110 sends the initial packet 310 of a request to a load balancer 140 that is acting as a trigger node. In this example, the initial packet 310 is a SYN packet initiating a TCP connection between the host 110 and the load balancer 140. The load balancer 140 responds to the SYN packet 310 with a SYN-ACK packet 312 directed to the host 110. The host 110 completes the TCP handshake with an ACK message 314.

After the load balancer 140 receives the initial packet 310, and while the TCP handshake is proceeding, the load balancer 140 sends a notification 320 to the COS 130 indicating that the initial packet 130 has been received at the load balancer 140. In one example, the notification 320 may include information (e.g., container/pod orchestration input) to assist the COS 130 in determining a set of containers in a pod to handle the request. For instance, the notification 320 may include a destination address of the initial packet 310. Additionally, the load balancer 140 may indicate that the request will be load balanced to a particular serving node 150. The COS 130 sends instructions 330 to the serving node 150, and the instructions 330 direct the serving node 150 (e.g., the container logic 156 in the serving node 150) to generate a particular pod with particular containers to handle the request from the host 110.

The container logic 156 in the serving node 150 instantiates the pod/containers at 340, as directed by the instructions 330. Once the pod with one or more containers is running on the serving node 150, the load balancer 140 forwards the entire request 350 to the serving node 150. In one example, the load balancer 140 may direct the request 350 to one or more of the containers running on the serving node 150 to handle the request 350.

In another example, the COS 130 generate instructions 330 directing the container logic 156 to generate containers based on a probabilistic assessment of which containers are likely to be needed to handle the request 350. For instance, if the initial packet 310 is directed to the address of a web server, the COS 130 may determine that the request 350 is likely to be a request for a web page, and may require additional functions to gather data (e.g., images, database records, etc.) to populate fields in the web page or to provide encryption/authentication. The COS 130 may send instructions 330 to the container logic 156 to instantiate containers with each of these functions that may be required to handle the request 350.

In a further example, the TCP handshake between the host 110 and the load balancer 140 may complete before the container logic 156 has completely instantiated the containers on the serving node 150, causing the load balancer 140 to send the request 350 to the serving node 150 before the serving node 150 can handle the request 350. In this example, the load balancer 140 may periodically resend the request 350 until the containers on the serving node 150 acknowledge receipt of the request 350 (e.g., via a completed TCP handshake between the load balancer 140 and the container on the serving node 150).

Figure 4:
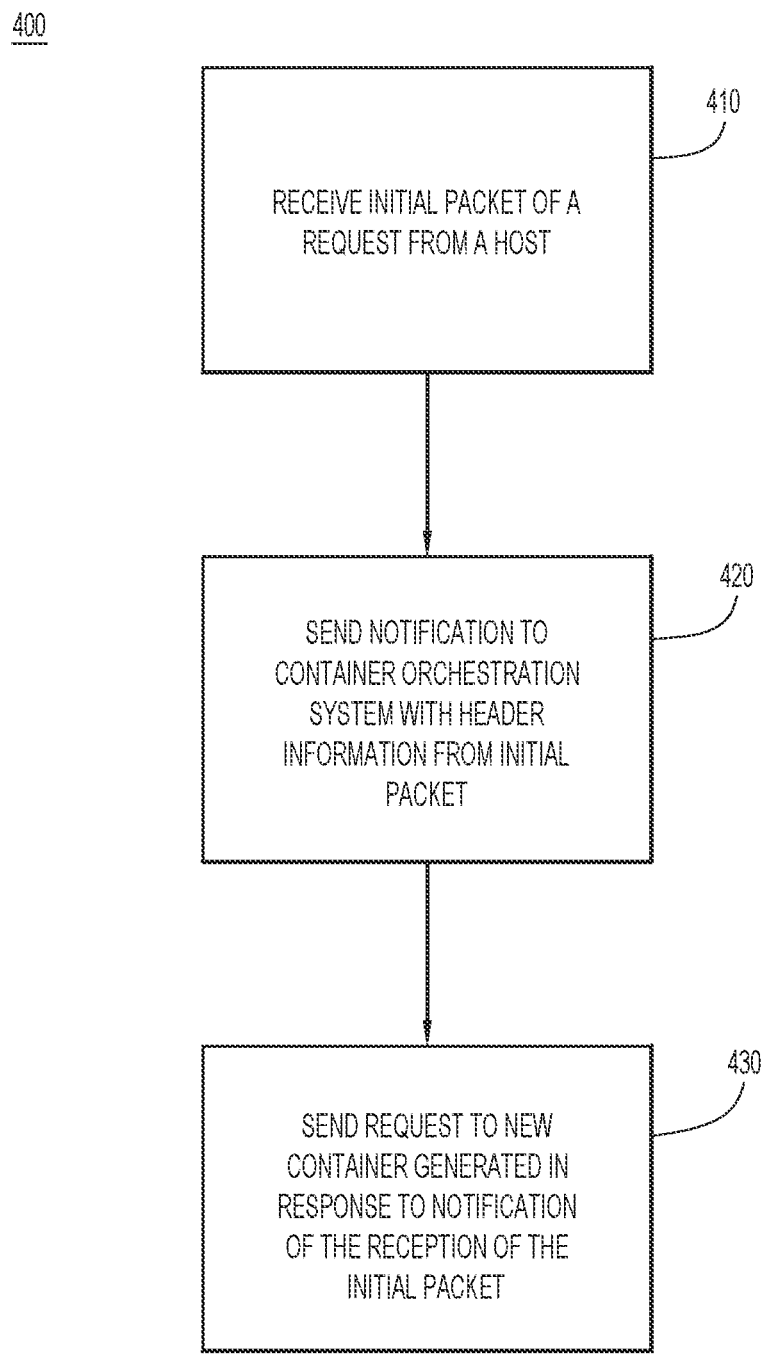
FIG. 4 is a flowchart illustrating operations of a network node to trigger the generation of containers to handle a request received at the network node, according to an example embodiment.

Referring now to FIG. 4, a flowchart illustrates operations performed at a trigger node (e.g., network node 120, load balancer 140, or virtual switch 154) in a process 400 to notify a container orchestration system of the need for containers as early as possible. At 410, the trigger node receives an initial packet of a request from a host. In one example, the initial packet may be a SYN packet to initiate a TCP connection from the host. The trigger node may respond to the initial packet (e.g., with a SYN-ACK packet) or allow the final destination of the packet to respond to the initial packet.

At 420, the trigger node sends a notification to the container orchestration system. The notification includes header information of the initial packet, such as a destination network address and/or a packet type. In one example, the trigger node does not parse the initial packet beyond the header information necessary to forward the packet. In other words, the trigger node does not parse the payload of the initial packet to derive the information for the notification to the container orchestration system.

At 430, the trigger node sends the request to a new container created by the container orchestration system in response to receiving the notification. In one example, the container orchestration system may determine one or more functions that may be needed to handle the request based on the header information sent by the trigger node. The container orchestration system may send instructions to a local agent on a serving node to instantiate the containers, which are determined to handle the request from the host.

Figure 5:
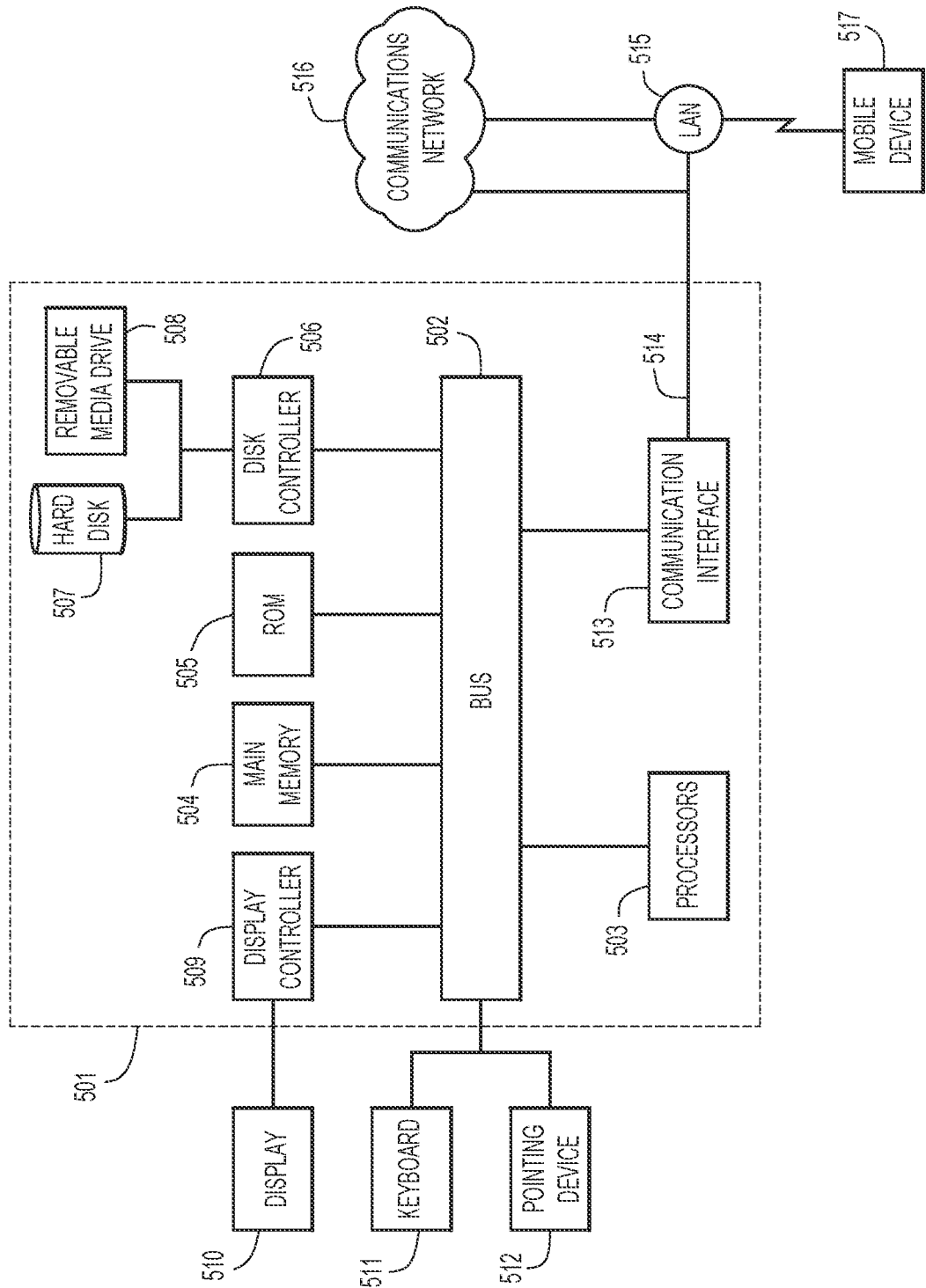
FIG. 5 illustrates a simplified block diagram of a device that may be configured to perform methods presented herein, according to an example embodiment.

Referring now to FIG. 5, an example of a computer system 501 (e.g., network node 120, load balancer 140, serving node 150, etc.) upon which the embodiments presented may be implemented is shown. The computer system 501 may be programmed to implement a computer based device, such as an endpoint, a network element, or a server running one or more virtual machines. The computer system 501 includes a bus 502 or other communication mechanism for communicating information, and a processor 503 coupled with the bus 502 for processing the information. While the figure shows a single block 503 for a processor, it should be understood that the processors 503 may represent a plurality of processing cores, each of which can perform separate processing. The computer system 501 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503.

The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive, solid state drive, etc.). The storage devices may be added to the computer system 501 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 501 may also include a display controller 509 coupled to the bus 502 to control a display 510, such as a cathode ray tube (CRT), liquid crystal display (LCD) or light emitting diode (LED) display, for displaying information to a computer user. The computer system 501 includes input devices, such as a keyboard 511 and a pointing device 512, for interacting with a computer user and providing information to the processor 503. The pointing device 512, for example, may be a mouse, a trackball, track pad, touch screen, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing steps of the operations presented herein in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the operations presented herein, and for enabling the computer system 501 to interact with a human user (e.g., network administration personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA), laptop computer, or cellular telephone.

In summary, pod creation and function execution from a network element based on API requests allows for a more seamless serverless experience. The serverless functions can be executed directly from the network element, where they run in a true serverless, API-driven manner. Regardless of the detecting network element (host or edge), the techniques presented herein provide advance warning of a necessary change to software configuration (i.e., running, reconfiguration, or otherwise). While load balancers may parse requests at a higher layer to achieve the same warning, the techniques presented herein allow the functionality to operate with non-stateful and unaware load balancing (e.g., Equal Cost MultiPath (ECMP) routing). By having a trigger node (e.g., a virtual switch or physical switch) determine when a request is about to take place, the container orchestration system can quickly spin up serverless functions to handle the request.

The techniques presented herein tightly integrate network components in support of a serverless environment. The network components may include physical switches, virtual switches, front-end load balancers, and a container orchestration system. The system dynamically creates pods of containers based on incoming requests, as rapidly as possible, in support of a serverless environment.

In one form, a system is provided to support a serverless environment and quickly generate containers to handle requests. The system comprises a first network node, a container orchestration system, and a serving node. The first network node is configured to receive an initial packet of a request from a host and send a notification to a container orchestration system. The notification includes header information from the initial packet and signals the reception of the initial packet of the request. The container orchestration system is configured to create a new container in response to the notification based on the header information of the initial packet. The serving node is configured to instantiate the new container, receive the request from the host, and process the request from the host with the new container.

In another form, a method is provided for a trigger node to notify a container orchestration system of an incoming request. The method comprises receiving an initial packet of a request from a host. The method also includes sending a notification to a container orchestration system. The notification includes header information of the initial packet. The notification signals the reception of the initial packet of the request, wherein the container orchestration system creates a new container in response to the notification based on the header information of the initial packet. The method further includes sending the request to a new container created by the container orchestration system in response to receiving the notification.

In yet another form, an apparatus comprising a network interface and a processor is provided. The network interface is configured to communicate with computing devices across a computer network. The processor is configured to receive, via the network interface, an initial packet of a request from a host. The processor is also configured to cause the network interface to send a notification to a container orchestration system. The notification includes header information of the initial packet. The processor is further configured to cause the network interface to send the request to a new container created by the container orchestration system in response to receiving the notification.

In one form, sending the notification comprises sending layer 2 or layer 3 information from the initial packet without parsing the initial packet at a higher layer. Furthermore, a protocol handshake may be completed with the host after sending the notification to the container orchestration system.

The request may, in one form, be sent to the serving node while the new container is being instantiated. The method may further include resending the request to the serving node until the new container acknowledges receipt of the request.

In still another form, a non-transitory computer readable storage media is provided that is encoded with instructions that, when executed by a processor, cause the processor to perform any of the methods described and shown herein.

In one form, the first network node may be further configured to send the notification to the container orchestration system by sending layer 2 or layer 3 information from the initial packet without parsing the initial packet at a higher layer.

In one form, the first network node may be further configured to complete a protocol handshake with the host after sending the notification to the container orchestration system.

The first network node, in one form, may be configured to: load balance the request to the serving node; and send the initial packet of the request to the serving node.

In one form, the container orchestration system instructs the serving node to instantiate a plurality of containers including the new container in response to the notification of the reception of the initial packet. A composition of the plurality of containers may be based on a probabilistic assessment of containers necessary to process the request.

The serving node may, in one form, be configured to remove the new container after processing the request.

The first network node may, in one for, be further configured to send the request to the serving node while the new container is being instantiated.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above description is intended by way of example only. In particular, the techniques described herein have been described with respect to particular protocols (e.g., TCP) and types of requests (e.g., API requests), but may be applied to any packet-based computer communication for any type of request from a host.

What is claimed is:

1. A system comprising:
a first network node configured to:
receive an initial packet of a request from a host, the initial packet initiating a protocol handshake with the host;
send a notification to a container orchestration system before continuing the protocol handshake, the notification including layer 2 or layer 3 header information from the initial packet without the first network node parsing the initial packet at a higher layer, wherein the container orchestration system creates a new container in response to the notification based on the header information of the initial packet; and
complete the protocol handshake with the host after sending the notification to the container orchestration system; and
a serving node configured to:
instantiate the new container;

receive the request from the host; and
process the request from the host with the new container.

2. The system of claim 1, wherein the first network node is further configured to:
load balance the request to the serving node; and
send the initial packet of the request to the serving node.

3. The system of claim 1, wherein the container orchestration system instructs the serving node to instantiate a plurality of containers including the new container in response to the notification.

4. The system of claim 3, wherein a composition of the plurality of containers is based on a probabilistic assessment of containers necessary to process the request.

5. The system of claim 1, wherein the serving node is further configured to remove the new container after processing the request.

6. The system of claim 1, wherein the first network node is further configured to send the request to the serving node while the new container is being instantiated.

7. A method comprising:
receiving an initial packet of a request from a host, the initial packet initiating a protocol handshake with the host;
sending a notification to a container orchestration system before continuing the protocol handshake with the host, the notification including layer 2 or layer 3 header information of the initial packet without parsing the initial packet at a higher layer;
sending the request to a new container created in a serving node by the container orchestration system in response to receiving the notification; and
complete the protocol handshake with the host after sending the notification to the container orchestration system.

8. The method of claim 7, further comprising:
load balancing the request to the serving node; and
sending the initial packet of the request to the serving node.

9. The method of claim 7, further comprising sending the request to the serving node while the new container is being instantiated.

10. The method of claim 9, further comprising resending the request to the serving node until the new container acknowledges receipt of the request.

11. An apparatus comprising:
a network interface configured to communicate with computing devices across a computer network; and
a processor configured to:
receive via the network interface, an initial packet of a request from a host, the initial packet initiating a protocol handshake with the host;
cause the network interface to send a notification to a container orchestration system before continuing the protocol handshake, the notification including layer 2 or layer 3 header information of the initial packet without parsing the initial packet at a higher layer;
cause the network interface to send the request to a new container created in a serving node by the container orchestration system in response to receiving the notification; and
complete the protocol handshake with the host after the network interface sends the notification to the container orchestration system.

12. The apparatus of claim 11, wherein the processor is further configured to:
load balance the request to the serving node; and
cause the network interface to send the initial packet of the request to the serving node.

13. The apparatus of claim 11, wherein the network interface is further configured to send the request to the serving node while the new container is being instantiated.

14. The apparatus of claim 13, wherein the network interface is configured to resend the request to the serving node until the new container acknowledges receipt of the request.

15. The system of claim 6, wherein the first network node is configured to periodically resend the request to the serving node until the new container acknowledges receipt of the request.

16. The system of claim 1, wherein the first network node is configured to complete the protocol handshake by receiving an acknowledgement packet from the host.

17. The method of claim 7, wherein completing the protocol handshake comprises receiving an acknowledgement packet from the host.

18. The method of claim 7, further comprising sending the request to a plurality of containers created in the serving node by the container orchestration system in response to receiving the notification, wherein a composition of the plurality of containers includes the new container and is based on a probabilistic assessment of containers necessary to processes the request.

19. The apparatus of claim 11, wherein the processor is further configured to complete the protocol handshake by receiving an acknowledgement packet form the host via the network interface.

20. The apparatus of claim 11, wherein the processor is further configured to cause the network interface to send the request to a plurality of containers created in the serving node in response to receiving the notification, wherein a composition of the plurality of containers includes the new container and is based on a probabilistic assessment of containers necessary to process the request.

* * * * *